United States Patent [19]

Yamashita et al.

[11] Patent Number: 5,389,769
[45] Date of Patent: Feb. 14, 1995

[54] ID RECOGNIZING SYSTEM IN SEMICONDUCTOR MANUFACTURING SYSTEM

[75] Inventors: Teppei Yamashita; Masanao Murata; Tsuyoshi Tanaka; Teruya Morita; Hitoshi Kawano; Atsushi Okuno; Masanori Tsuda; Mitsuhiro Hayashi, all of Ise, Japan

[73] Assignee: Shinko Electric Co., Ltd., Tokyo, Japan

[21] Appl. No.: 37,976

[22] Filed: Mar. 26, 1993

[30] Foreign Application Priority Data

Mar. 27, 1992 [JP] Japan .................. 4-071378

[51] Int. Cl.⁶ .......................... G06F 15/46
[52] U.S. Cl. ................................. 235/375
[58] Field of Search ............... 235/375, 382.5; 340/825.69, 825.72, 825.73

[56] References Cited

U.S. PATENT DOCUMENTS

| | | | |
|---|---|---|---|
| 3,646,651 | 3/1972 | McGaughey et al. | 29/130 |
| 3,780,368 | 12/1973 | Northeved et al. | |
| 3,796,327 | 3/1974 | Meyer et al. | |
| 4,237,598 | 12/1980 | Williamson . | |
| 4,415,065 | 11/1983 | Sandstedt . | |
| 4,428,708 | 1/1984 | Burt . | |
| 4,490,798 | 12/1984 | Franks et al. | |
| 4,492,504 | 1/1985 | Hainsworth . | |
| 4,514,815 | 4/1985 | Anderson . | |
| 4,525,713 | 6/1985 | Barletta et al. | 235/442 X |
| 4,766,295 | 8/1988 | Davis et al. | 235/383 |
| 4,822,990 | 4/1989 | Tamada et al. | 235/492 |
| 4,827,110 | 5/1989 | Rossi et al. | |
| 4,879,756 | 11/1989 | Stevens et al. | 340/825.69 X |
| 4,888,473 | 12/1989 | Rossi et al. | |
| 4,888,709 | 12/1989 | Resevz et al. | 340/825.15 X |
| 5,003,536 | 3/1991 | Tanaka et al. | 370/94.1 |
| 5,097,421 | 3/1992 | Maney et al. | 364/478 |
| 5,115,236 | 5/1992 | Kohler | 340/825.69 |
| 5,173,840 | 12/1992 | Kodai et al. | 235/492 |

FOREIGN PATENT DOCUMENTS

| | | |
|---|---|---|
| 0448507 | 8/1991 | European Pat. Off. . |
| 3736288 | 11/1989 | Germany . |
| 63-503260 | 11/1988 | Japan . |
| 2022894 | 12/1979 | United Kingdom . |

OTHER PUBLICATIONS

*Smart Traveler System*, ASYST Technologies, Oct. 1987.

Primary Examiner—John Shepperd
Attorney, Agent, or Firm—Bacon & Thomas

[57] ABSTRACT

An ID recognizing system for a semiconductor manufacturing system includes IC modules set in surfaces of containers which accommodate wafers and are conveyed from one device to another in the semiconductor manufacturing system. Each IC module is capable of transmitting and receiving signals from fixed stations and includes a reloadable memory. The semiconductor manufacturing system is made up of a number of devices for performing manufacturing operations on the wafers in the containers, and each of the devices include one of the fixed stations. The IC module is powered by the energy of radio waves received from the fixed station in the device in which said container has been placed for processing of the wafers therein. The radio communication is in the form of communication packets which include data on individual wafers in the cassettes so that the individual wafers can be processed separately. The position or off-set of the data within the packet indicates the position of the corresponding wafer within the container.

13 Claims, 7 Drawing Sheets

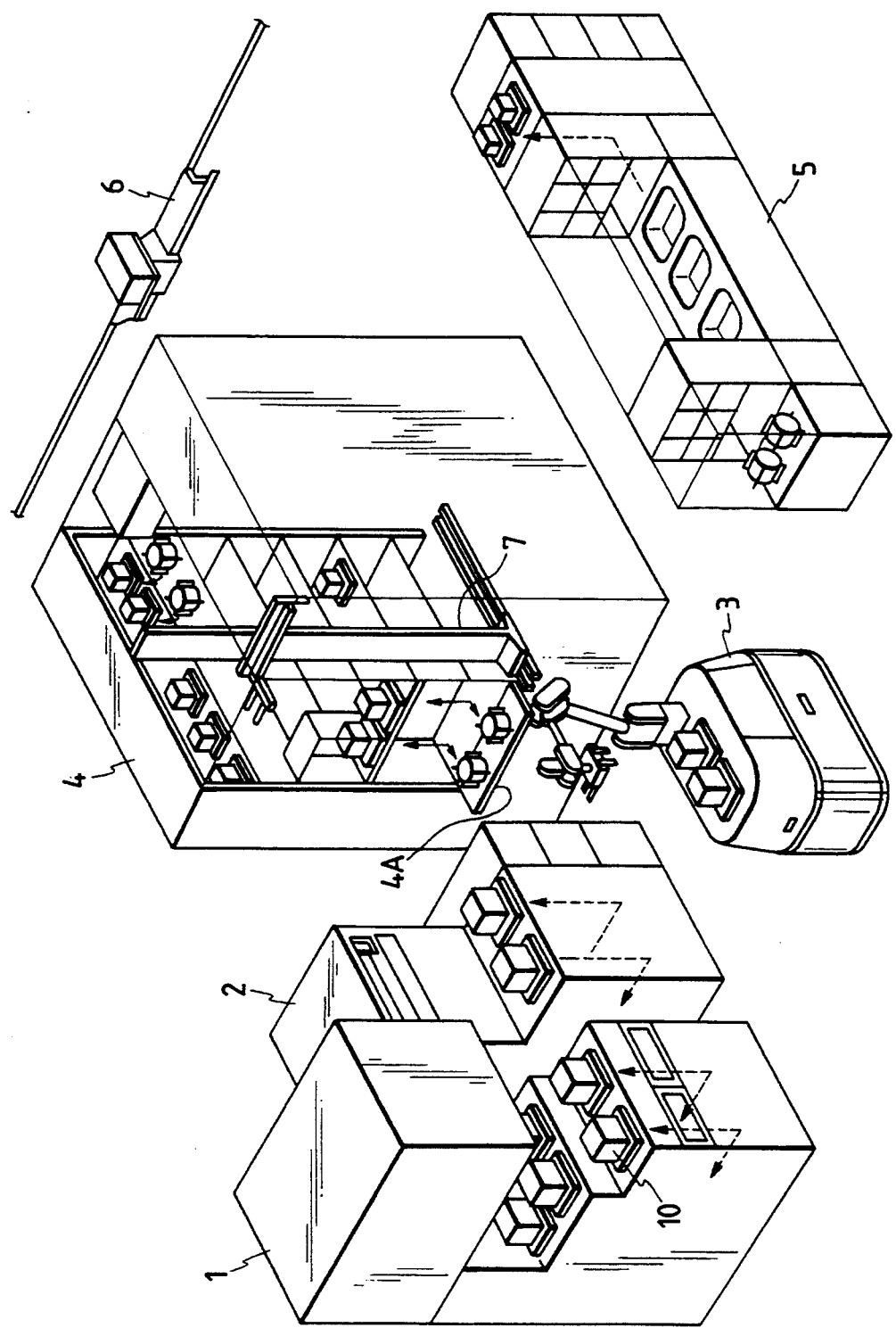

ID RECOGNIZING SYSTEM IN SEMICONDUCTOR MANUFACTURING SYSTEM

BACKGROUND OF THE INVENTION

This invention relates to a system for recognizing the ID numbers of cassettes or the like in a semiconductor manufacturing system in a clean room for manufacturing semiconductor wafers, liquid crystal display boards, reticles, disks, etc. (hereinafter referred to as "an ID recognizing system", when applicable).

One example of a semiconductor manufacturing system of this type is as shown in FIG. 8. In FIG. 8, reference numeral 1 designates a surface treatment device incorporating a surface treatment furnace for giving surface treatment to semiconductor wafers, the device 1 having two ports (described later) arranged in parallel; 2, a wafer inspecting device; 3, a self-running type positioning robot; 4, a wafer storehouse; 4A, the apron (or entrance) of the wafer storehouse 4; a wafer washing device; and 6, a linear motor conveyor.

FIG. 9 is a sectional view of the aforementioned surface treatment device 1. In FIG. 9, reference numeral 10 designates a closed container with an opening 11 which is sealingly closed through a seal 12 with a lid 13. The lid incorporates an automatic locking mechanism (not shown) with a rod 14. The rod 14 is moved back and forth, so that its end is engaged with the opening 11 of the container 10. Further in FIG. 9, reference numeral 15 designates a wafer cassette, in which a plurality of semiconductor wafers W (for instance twenty-five semiconductor wafers W) are set one above another. The wafer cassette 15 is set in the container 10 when conveyed. FIG. 9 shows the container 10 including the wafer cassette 15 which container is placed on a plate 16 of the surface treatment device 1. The plate 16 forms the above-described port (or cassette taking-in-and-out ports) 16A. The container 10 is locked onto the plate 16 with lever-type locking mechanisms 17, and thereupon the self-locking mechanism of the lid 13 is released. The wafer cassette 15 together with the lid 13 is placed on the stand 18 of a lift 18 and moved downwardly, and then only the wafer cassette 15 is conveyed to the surface treatment furnace (not shown) by the conveyor. After the surface treatment of the semiconductor wafers has been accomplished, the wafer cassette 15 is moved back to the lift stand 18A on which the lid 13 has been left. Thereafter, the lift stand 18A is moved upwardly, so that the wafer cassette 15 is brought into the container 10. Under this condition, the lid 13 is locked; that is, the container 10 is closed with the lid 13 thus locked. The container 10 thus closed is moved to the apron 4A of the wafer storehouse 4 by the robot 3. In the wafer storehouse 4, a stacking crane 7 is operated to set the container 10 at a predetermined position on a shelf specified by a central control device (not shown).

Semiconductor wafers or the like should be free from dust. Therefore, a semiconductor manufacturing process is carried out in a clean room having a clean atmosphere, and heretofore the wafer cassette 15 is not covered when conveyed from one processing device to another. However, as the integration of semiconductor circuits is improved, the wafer cassette 15 is handled as follows: That is, the wafer cassette 15 is set in the closed container 10 before moved between processing devices. In addition, the closed container 10 is filled with inert gas, to suppress the formation of natural oxide films on the semiconductor wafers.

The wafer cassette 15 is moved from one processing device to another and from one processing station to another. Therefore, it is essential to read the identification (ID) of the wafer cassette 15 to determine what the latter contains. In most of the conventional cassette recognizing systems, an ID number of bar-code type affixed to the wafer cassette is optically read. In another system, a surface elastic wave is utilized to read the ID number, in a non-contact mode, from a tag affixed to the wafer cassette 15.

As was described above, in the conventional system, the ID number is of bar-code type, and it cannot be rewritten without changing the bar code. That is, in order to change it, a new bar code label must be affixed to the wafer cassette. The base plate of the bar code label forms a protrusion on the surface of the cassette or container which obstructs the self cleaning operation, with a result that a chemical washing operation cannot be carried out.

On the other hand, in association with CIM, it has been demanded that data such as the manufacture history and conditions of a wafer cassette be transferred together with the cassette and the container. However, the bar code system, being small in the quantity of data to be handled thereby, cannot satisfy this demand.

SUMMARY OF THE INVENTION

Accordingly, an object of this invention is to eliminate the above-described difficulties accompanying a conventional ID recognizing system. More specifically, an object of the invention is to provide an ID recognizing system for a semiconductor manufacturing system in which an ID module can be mounted on a cassette or container without formation of a protrusion which may obstruct the self-cleaning operation, and in order to change the data, it is unnecessary to remove the ID module from the cassette or container and to affix it thereto again, and the ID module has a memory capable of storing a large quantity of data, and, of the large quantity of data, necessary data can be obtained when necessary, merely by changing the packet, and the control data can be moved together with the cassette or container.

The foregoing object of the invention has been achieved by the provision of an ID recognizing system for a semiconductor manufacturing system, which, according to first aspect of the present invention, comprises: an IC module which is set on the surface of a container which accommodates wafers and is conveyed from one device to another in the semiconductor manufacturing system, the IC module having a signal transmitting and receiving function, and a reloadable memory; and a fixed station fixedly set at a predetermined position in each of the devices so as to perform two-way radio communication with the IC module, the IC module operating by using the energy of radio waves received as an electrical power source.

According to second aspect of the present invention, the IC module is mounted on the outer surface of the container in such a manner that the IC module is buried therein, and its exposed surface is covered with a molded layer.

According to third aspect of the present invention, the container is a cassette in which a plurality of wafers are stacked one above another, According to fourth aspect of the present invention, the container is a closed container for accommodating a cassette in which a plurality of wafers are stacked one above another.

According to fifth aspect of the present invention, the fixed station is provided with a sensor which detects the positioning of the container at a predetermined position, and establishes a communication link with the IC module with the output of the sensor corresponding to a trigger signal.

According to six aspect of the present invention, the data packet by which information is transmitted includes an off-set between the cassette ID code in the packet and data concerning an individual wafer, the amount of the off-set (i.e., the position of the data relative to the ID code) indicating the position of the individual wafer in the cassette.

According to sixth aspect of the present invention, memory of the IC module has a region for storing ID data, and a region for storing data on shelves in a cassette and on wafers set on the shelves.

In the ID recognizing system of the present invention, the IC module provided on the cassette or container performs two-way radio communication with the fixed station provided at a processing device in the semiconductor manufacturing system. In response to a read instruction from the fixed station, the ID module reads the corresponding data from the memory, and transmits it to the fixed station. In addition, in response to a write instruction from the fixed station, the IC module writes data in the memory or changes the contents of the latter.

BRIEF DESCRIPTION OF THE DRAWINGS

FIG. 8 is a perspective view showing an example of a semiconductor manufacturing system.

DETAILED DESCRIPTION OF THE PREFERRED EMBODIMENTS

Preferred embodiments of the invention will be described with reference to the accompanying drawings.

Figure 1A:
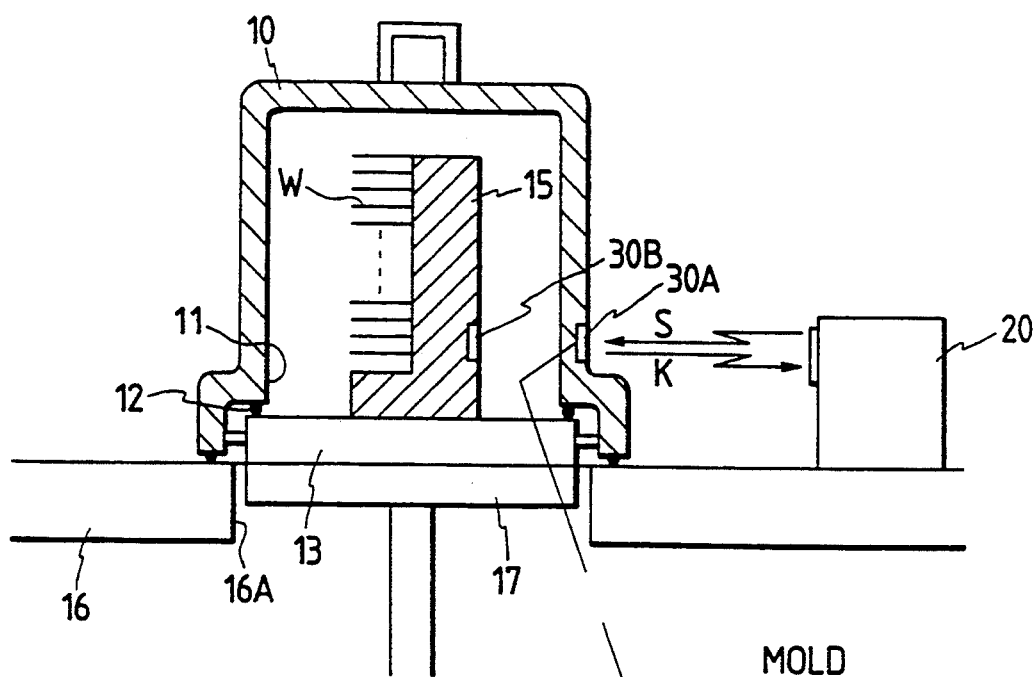
FIG. 1 is an explanatory diagram showing the arrangement of a first embodiment of this invention.
Figure 1B:
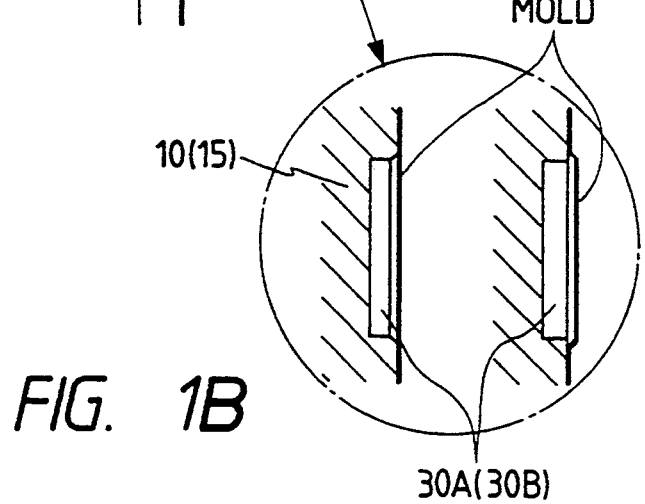

A first embodiment of the invention is as shown in FIG. 1.

Figure 9:
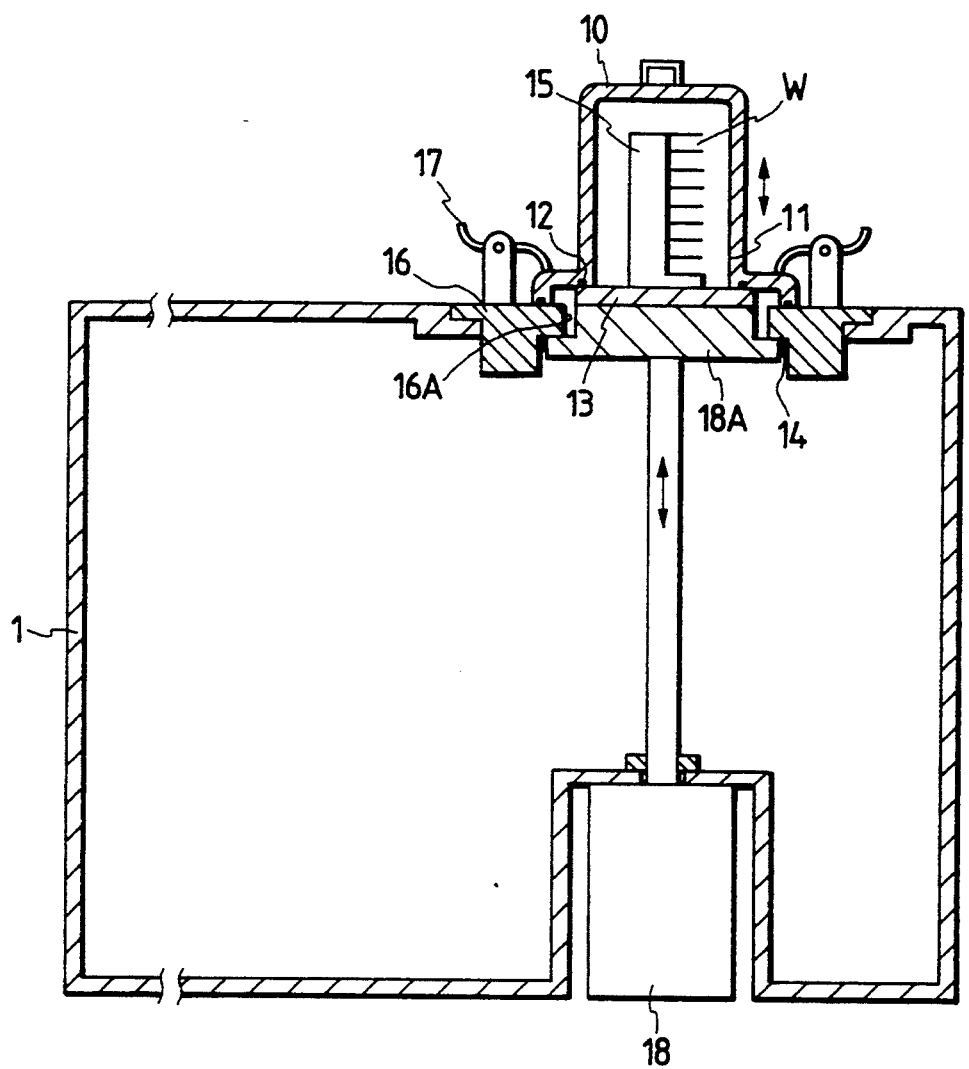
FIG. 9 is a fragmentary sectional view showing a surface treatment device in the semiconductor manufacturing system.

In FIG. 1, reference numeral 20 designates a fixed station, which is located near the port 16A of the surface treatment device 1 shown in FIG. 9; and 30A and 30B, card-shaped IC modules which are buried in predetermined regions of the surfaces of the container 10 and the wafer cassette 15, respectively. The outer surfaces of those IC modules 30A and 30B are resin-molded; that is, they are covered by resin layers, as encircled in FIG. 1. Reference numeral 40 designates a central processing unit (CPU).

Figure 2:
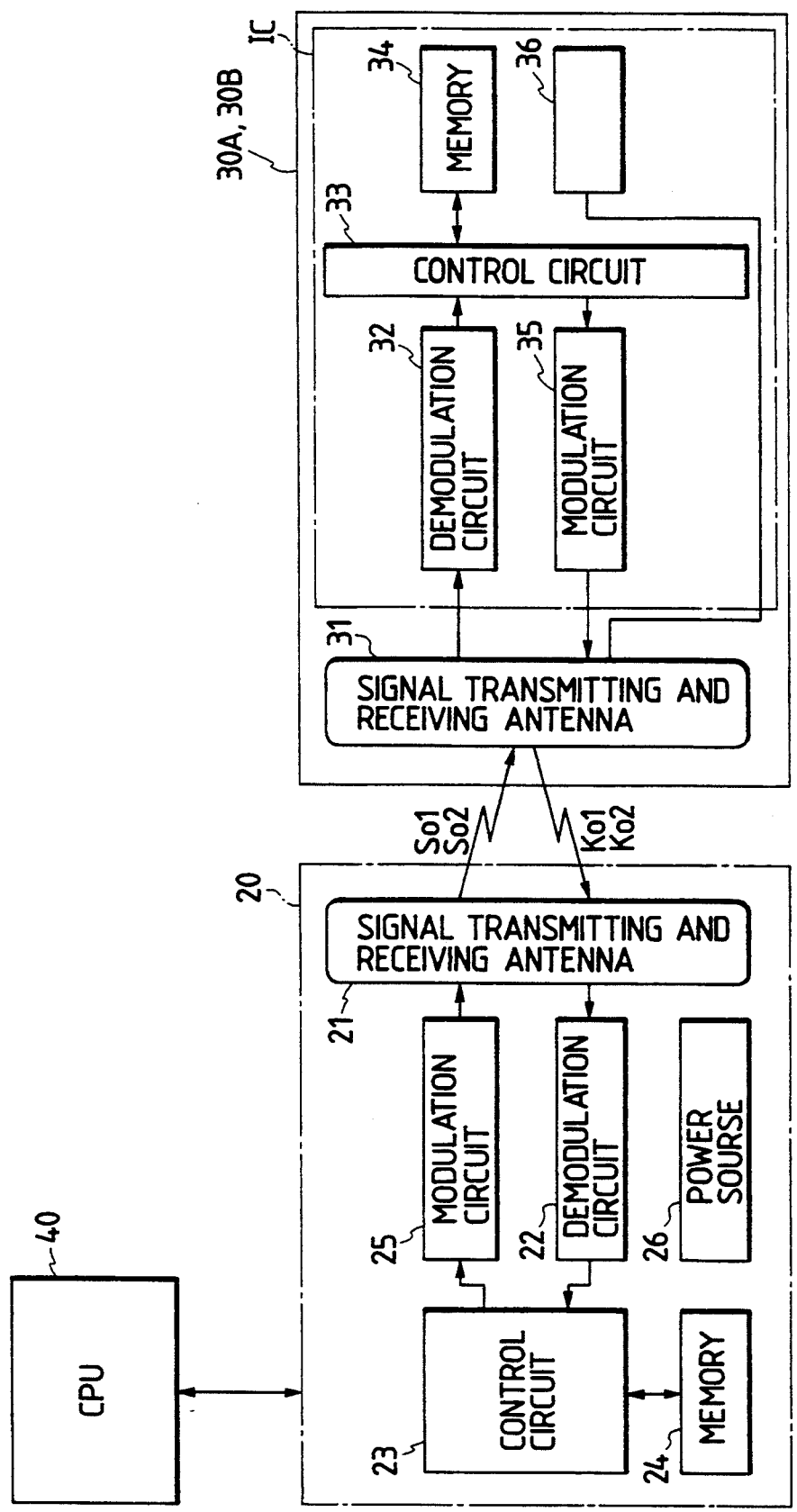
FIG. 2 is a block diagram showing the arrangement of a fixed station and an ID module in the first embodiment.

FIG. 2 shows the internal arrangements of the IC modules 30A and 30B and the fixed station 20. In FIG. 2, reference numeral 21 designates a signal transmitting and receiving antenna (or loop antenna); 22, a demodulation circuit; 23, a control circuit; 24, a memory; 25, a modulation circuit; and 26, a power source. Those circuit elements 21 through 26 form the fixed station 20. The fixed station 20 transmits an induction radio wave. Further in FIG. 2, reference numeral 31 designates a signal transmitting and receiving antenna (or loop antenna); 32, a demodulation circuit; 33, a control circuit; 34, a reloadable memory (such as an EEPROM); 35 a modulation circuit, and 36, a regulator. Those circuit elements 31 through 36 form an ID module 30A or 30B. In the ID module 30A (or 30B), the regulator operates to convert the energy of the received radio wave into DC power. The DC power thus obtained is used, as drive power, to operate the ID module.

In the system thus arranged, the fixed station 20 receives data from the central processing unit 40 and stores in the memory 24. The data is for the container 10 and the wafer cassette 15 which is set at one port 16A of the surface treatment device 1. It is assumed that the ID number of the container 10 is "No. 1", and that of the wafer cassette 15 is "No. 2".

Figure 6A:
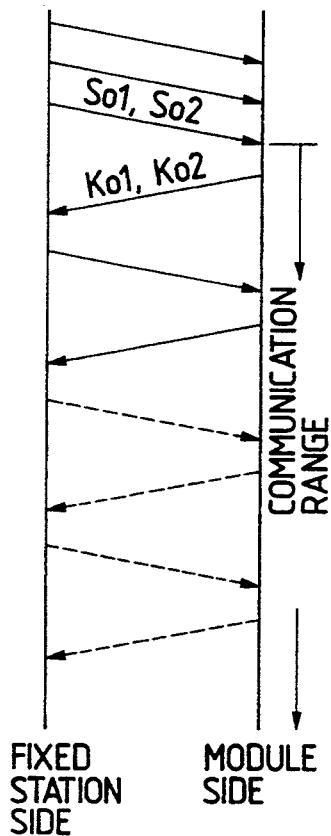
FIG. 6 (A) and (B) are communication charts for a description of the operations of the above-described embodiments of the invention.
Figure 6B:
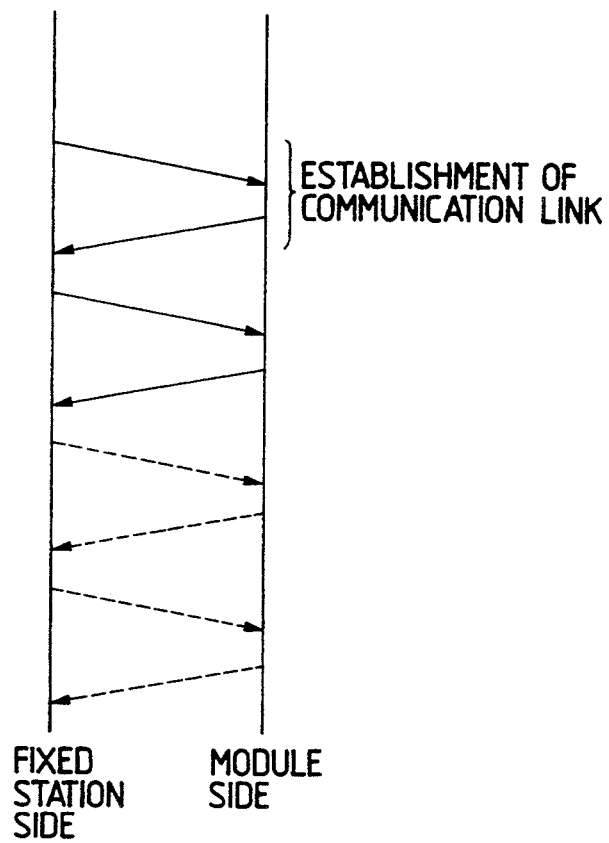

(1) It is assumed that, as shown in FIG. 6 (A), the fixed station 20 is transmitting a calling signal $S_{01}$ to the "No. 1" container 10 through the antenna 21. The IC module 30A of the container 10 on the plate 16 is in a communication range; that is, it is able to perform radio communication with the fixed station 20. Therefore, the calling signal is received by the IC module 30A. In the IC module 30A, the calling signal is demodulated by the demodulation circuit 32. The control circuit 33 decodes the output of the demodulation circuit 32, and reads the coded ID number, "No. 1", from the memory 34 to determine whether or not the calling signal $S_{01}$ is for the IC module 30A. When it is determined that the calling signal is for the IC module 30A, the latter transmits a response signal $K_{01}$ to the fixed station 30 through the antenna 31.

(2) In the fixed station 20, the response signal is demodulated by the demodulation circuit 22. The output of the demodulation circuit 22 is applied to the control circuit 23. The control circuit 23 confirms that the ID number of the container 10 set at the port 16A of the plate 16 is "No. 1", and transmits it to the central processing unit (CPU). In the case where it is required for the IC module 30A additionally to read data from or to rewrite the data in the memory 34, the fixed station 20 transmits a read instruction or rewrite instruction. In response to the read instruction or rewrite instruction, the IC modules 30A performs a data reading or writing operation.

(3) After completion of the communications with the ID module 30A, the fixed station 20 transmits a call signal $S_{02}$ to the other ID module 30B of the wafer cassette whose ID number is "No. 2". In the IC module 30B, the calling signal is demodulated by the demodulation circuit 32. The control circuit 33 decodes the output of the demodulation circuit 32, and reads the coded ID number, "No. 2", from the memory 34 to determine whether or not the calling signal $S_{02}$ is for the IC module 30B. When it is determined that the calling signal is for the IC module 30B, the latter transmits a response signal $K_{02}$ to the fixed station 30 through the antenna (or loop antenna) 31. In the fixed station 20, similarly as in the above-described case, the response signal $K_{02}$ is demodulated by the demodulation circuit 22. The output of the demodulation circuit 22 is applied to the control circuit 23. The control circuit 23 confirms that the ID number of the wafer cassette 15 in the "No. 1" container 10 set at the port 16A of the plate 16 is "No. 2", and informs the central processing unit (CPU) 40 of the fact that the specified wafer cassette 15 has been set in the specified container 10. In the case where it is required for the IC module 30B additionally to read data from or to rewrite the data in the memory 34, the fixed station 20 transmits a read instruction or rewrite instruction.

Figure 7A:
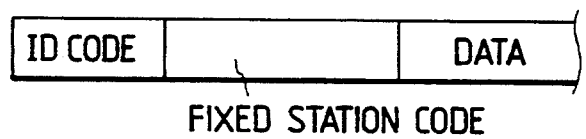
FIG. 7 (A) to (C) ate explanatory diagrams showing packets employed in the above-described embodiments.
Figure 7B:
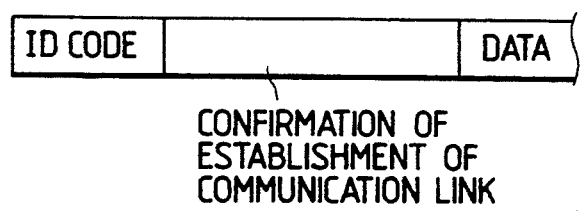
Figure 7C:

Communications between the fixed station 20 and the IC module 30A or 30B are carried out by using a packet with a signal transmitting side ID code and a signal receiving side ID code as shown in FIG. 7 (A).

In the embodiment, each of the IC modules 30A and 30B has the reloadable memory 34. Therefore the ID number can be changed by rewriting the contents of the memory 34. This rewriting operation can be achieved by the fixed station 20. That is, the embodiment is able to change the ID number with ease, being free from the difficulty accompanying the conventional bar-code system that it is necessary to affix a new bar-code label to renew the ID number.

As shown in FIG. 1, the IC modules 30A and 30B can be covered with resin mold. Therefore, the IC modules can be set flat on the walls of the container 10 and the wafer cassette 15. Hence, they will not obstruct the washing Operation.

Furthermore, each of the IC modules 30A and 30B forms its drive power from the radio wave received. Hence, it is unnecessary to the IC modules to have a power source such as a battery, and therefore the IC modules can be miniaturized as much.

Figure 4:
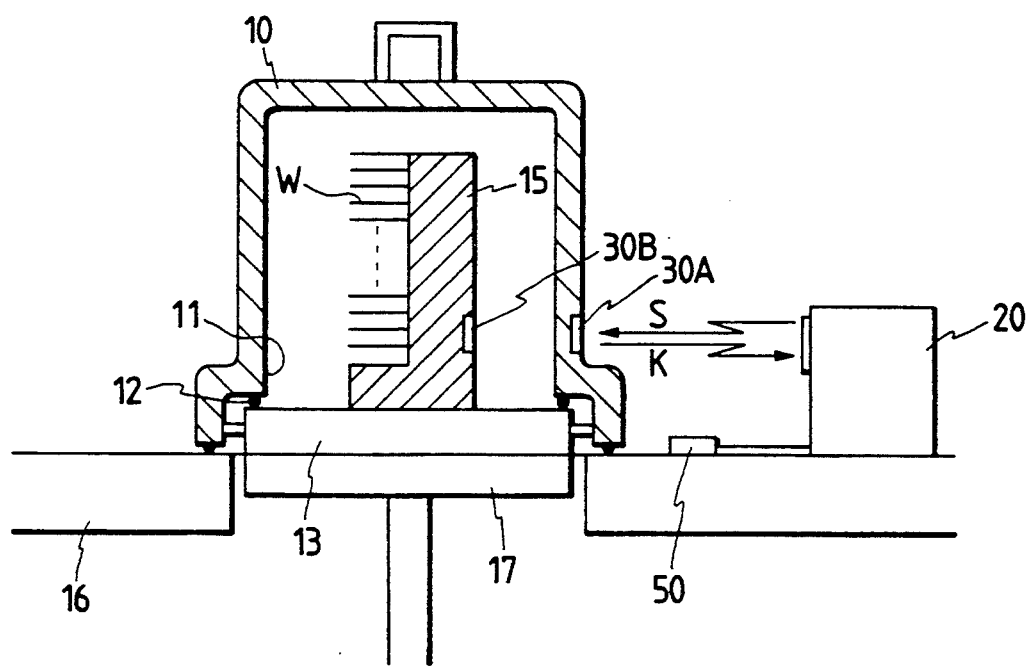
FIG. 4 is an explanatory diagram showing the arrangement of a second embodiment of the invention.
Figure 5:
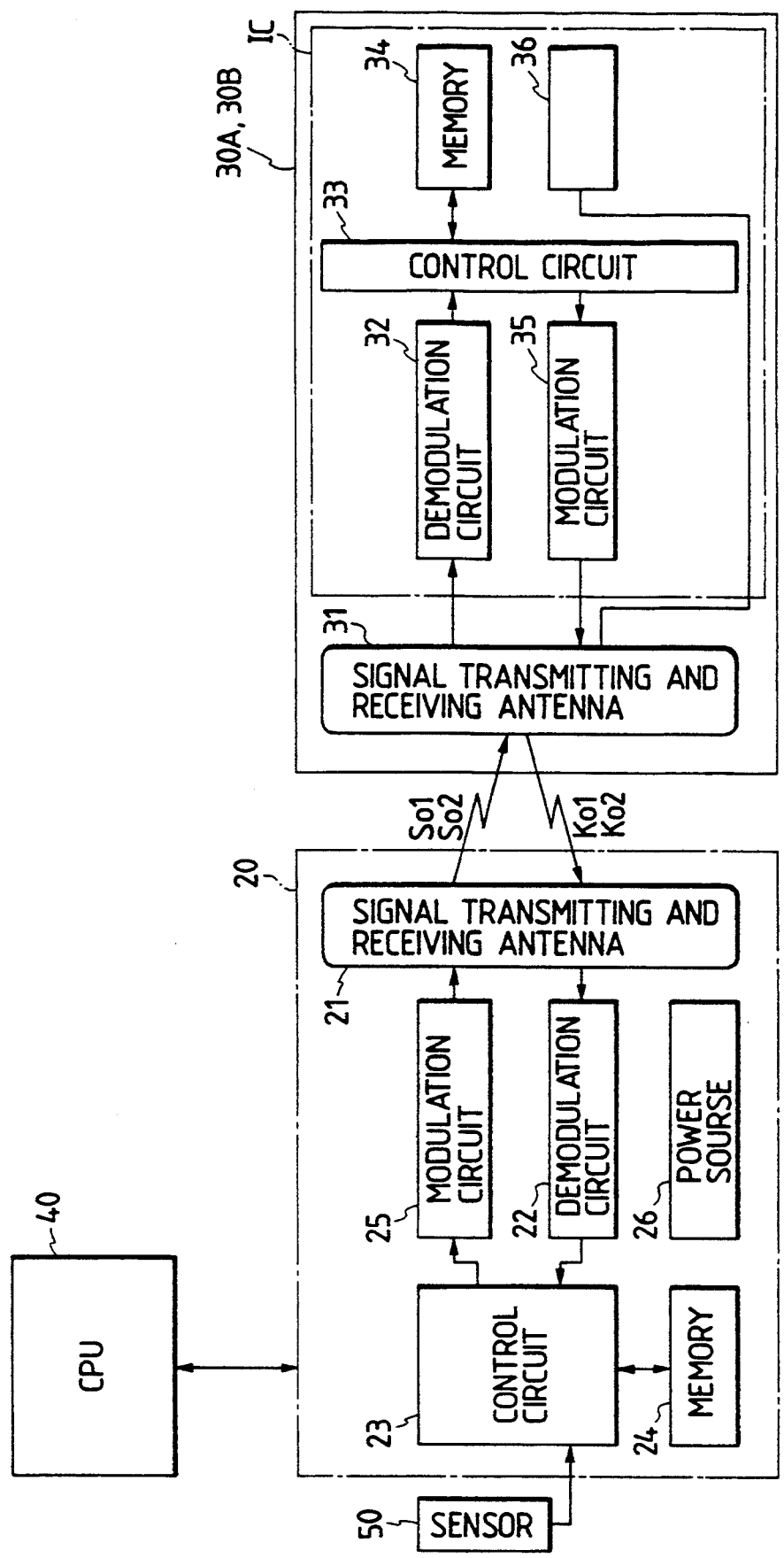
FIG. 5 is a block diagram showing the arrangement of a fixed station and an ID module in the second embodiment.

FIGS. 4 and 5 shows a second embodiment of the invention. The second embodiment is different from the above-described first embodiment in that a sensor is provided to detect the positioning of the container 10 on the plate 16.

When the container 10 is positioned on the plate 16, the sensor 5 detects it to output a detection signal g, which is applied to the control circuit 23 in the fixed station 20. Upon reception of the detection signal g, the control circuit 23 transmits a calling signal $S_{01}$ to the No. 1 container 10 to establish a communications link with the IC module 30A as shown in FIG. 6 (B). After the establishment of the communications link, communications between the fixed station 20 and the IC module 30A are carried out by using a packet as shown in FIG. 7 (B). The communications therebetween are disregarded by the IC module 30B. After completion of the communications, the instruction frame is rewritten into "communication link termination confirmed". Thereafter, the fixed station 20 establishes a communications link with the ID module 30B.

In the second embodiment, the communication efficiency is higher than in the first embodiment in which the packet shown in FIG. 7 (A) is used for communication.

Figure 3:
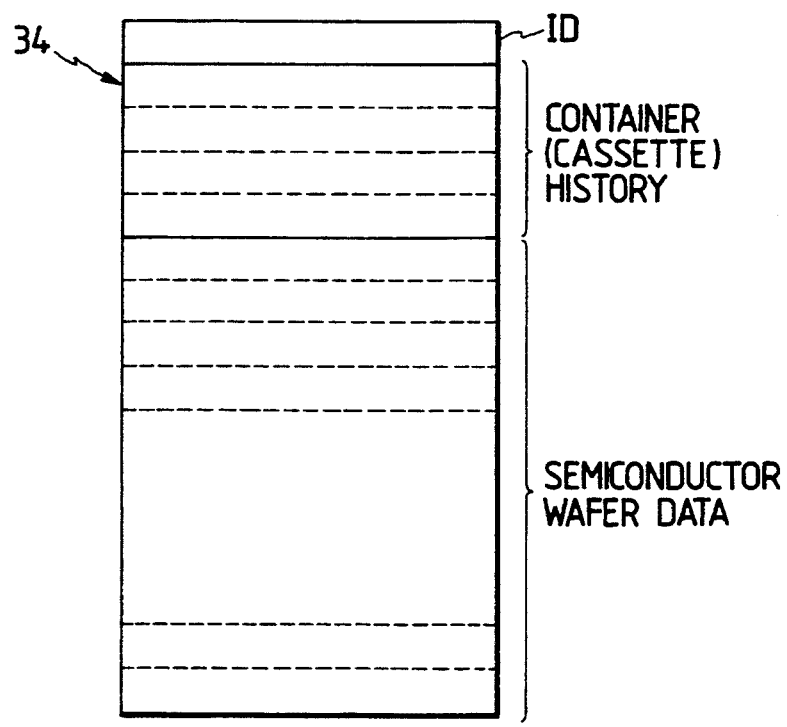
FIG. 3 is an explanatory diagram showing the arrangement of a memory in the IC module in the first embodiment.

Each of the modules 30A and 30B, having the memory 34, may have more data than the conventional bar-code system; that is, it may have an ID code, a container history or wafer history, and data on a semiconductor wafer as shown in FIG. 3.

Hence, if a communication packet as shown in FIG. 7 (C) is employed, and the off-set frame, i.e., the position within the packet of the data on the semiconductor wafer, is used to specify the shelf on which the individual wafer in cassette 15 is set, then the fixed station 20 can detect the data on the semiconductor wafers on the shelf, so that the semiconductor wafers can be individually controlled in treatment.

In the above-described embodiments, the wafer cassette 15 is loaded in the container 10 and conveyed; however, the invention is not limited thereto or thereby. That is, the technical concept of the invention may be applied, with the same effect, to a semiconductor manufacturing system in which no container 10 is used; that is, the wafer cassette 15 is conveyed without the container 10.

In the above-described embodiments, communications are carried out between the fixed station 20 and the IC modules 30A and 30B. However, the embodiments may be modified as follows: The signal transmitting and receiving antenna (or loop antenna) 21 is set at a predetermined position in the device, so that the IC module 30A or 30B performs radio communication with the central processing unit 40 directly through the antenna 21.

As was describe above, in the system of the invention, the ID module provided on the cassette or container is electromagnetically coupled through induction radio waves to the fixed station provided at the processing device, and has the signal transmitting and receiving antenna and the reloadable memory. Therefore, the ID module can be mounted on the cassette or container without formation of a protrusion which may obstruct the self-cleaning operation. In addition, the data stored in the memory can be readily changed; that is, the contents of the memory can be rewritten merely by transmitting an instruction signal from the fixed station. Further-more, in the system of the invention, unlike the prior art using the bar-code system, in order to change the data, it is unnecessary to remove the ID module from the cassette or container and to affix it thereto again. In addition, the ID module has the memory capable of storing a large quantity of data, and, of the large quantity of data, necessary data can be given to the fixed station when necessary, merely by changing the packet. Hence, in the semiconductor manufacturing system, the semiconductor wafers in the cassette can be controlled individually as well as the cassette and the container.

What is claimed is:

1. An ID recognizing system in a semiconductor manufacturing system, comprising:
    an IC module for transmitting/receiving a signal, said IC module being buried in a surface of a container and covered with a molded layer, wherein said container accommodates wafers and is conveyed from one device to another in said semiconductor manufacturing system, said IC module having a reloadable memory; and
    a fixed station including means for exchanging radio communication packets with said IC module, said fixed station being fixedly set at a predetermined position in each of said devices, wherein said IC module is powered by radio waves carry said communication packets and which are transmitted from said fixed station, and wherein said communication packets contain a container ID code and data on one of said wafers, an amount of off-set of said data on said one of said wafers relative to said container ID code indicating a position of the wafer in-the container.

2. An ID recognizing system as claimed in claim 1, said container is a cassette in which a plurality of wafers are stacked one above another.

3. An ID recognizing system as claimed in claim 1, said container is a cassette in which a plurality of wafers are stacked one above another.

4. An ID recognizing system as claimed in claim 1, wherein said container is a closed container for accommodating a cassette in which a plurality of wafers are stacked one above another.

5. An ID recognizing system as claimed in claim 1, wherein said container is a closed container for accommodating a cassette in which a plurality of wafers are stacked one above another.

6. An ID recognizing system as claimed in claim 1, wherein said container is a cassette having shelves in which individual wafers are positioned, and wherein said memory of said IC module has a region for storing cassette ID data, and a region for storing data on said shelves and on the wafers set on said shelves.

7. An ID recognizing system as claimed in claim 1, further comprising:

a sensor for detecting a position of the container at a predetermined position, said sensor being mounted on the fixed station, said fixed station establishing a communication link with said IC module in response to an output of said sensor corresponding to a trigger signal.

8. An ID recognizing system as claimed in claim 7, wherein said IC module is mounted on the outer surface of said container in such a manner that said IC module is buried therein, and an exposed surface thereof is covered with a molded layer.

9. An ID recognizing system as claimed in claim 8, said container is a cassette in which a plurality of wafers are stacked one above another.

10. An ID recognizing system as claimed in claim 8, wherein said container is a closed container for accommodating a cassette in which a plurality of wafers are stacked one above another.

11. An ID recognizing system as claimed in claim 7, said container is a cassette in which a plurality of wafers are stacked one above another.

12. An ID recognizing system as claimed in claim 7, wherein said container is a closed container for accommodating a cassette in which a plurality of wafers are stacked one above another.

13. An ID recognizing system as claimed in claim 7, wherein said container is a cassette having shelves in which individual wafers are positioned, and wherein said memory of said IC module has a region for storing cassette ID data, and a region for storing data on said shelves and on the wafers set on said shelves.

* * * * *